United States Patent
Colin et al.

(10) Patent No.: US 10,644,313 B2
(45) Date of Patent: May 5, 2020

(54) CATHODE MATERIAL FOR LI-ION BATTERIES

(71) Applicant: Commissariat a l'Energie Atomique et aux Energies Alternatives, Paris (FR)

(72) Inventors: Jean-François Colin, Meylan (FR); Carole Bourbon, Saint-Michel de Saint Geoirs (FR); Quentin Jacquet, Grenoble (FR)

(73) Assignee: Commissariat a l'Energie Atomique et aux Energies, Paris (FR)

( * ) Notice: Subject to any disclaimer, the term of this patent is extended or adjusted under 35 U.S.C. 154(b) by 178 days.

(21) Appl. No.: 15/774,713

(22) PCT Filed: Nov. 29, 2016

(86) PCT No.: PCT/FR2016/053133
§ 371 (c)(1),
(2) Date: May 9, 2018

(87) PCT Pub. No.: WO2017/098113
PCT Pub. Date: Jun. 15, 2017

(65) Prior Publication Data
US 2018/0331359 A1    Nov. 15, 2018

(30) Foreign Application Priority Data

Dec. 9, 2015  (FR) .................... 15 62097

(51) Int. Cl.
*H01M 4/00* (2006.01)
*H01M 4/525* (2010.01)
(Continued)

(52) U.S. Cl.
CPC ............ *H01M 4/525* (2013.01); *C01G 53/42* (2013.01); *H01M 4/485* (2013.01);
(Continued)

(58) Field of Classification Search
CPC ............ C01G 53/42; H01M 2004/027; H01M 2004/021; C01P 2004/04; C01P 2004/50
See application file for complete search history.

(56) References Cited

U.S. PATENT DOCUMENTS

2011/0136011 A1* 6/2011 Yura ................... C01G 45/1242
429/224
2013/0122373 A1* 5/2013 Tamura ............. H01M 10/0525
429/221

FOREIGN PATENT DOCUMENTS

CN         104269520      1/2015
JP         2013206746     10/2013
(Continued)

OTHER PUBLICATIONS

Bingbing Tian, et al, Niobium Doped Lithium Titanate as a High rate Anode Material for Li-Ion Batteries, Electrochimica Acta 55 (2010) 5453-5458.

(Continued)

*Primary Examiner* — Cynthia H Kelly
*Assistant Examiner* — Monique M Wills
(74) *Attorney, Agent, or Firm* — Forge IP, PLLC

(57) ABSTRACT

An electrode material of formula $Li_{2+x}Ni_uTi_vNb_wO_4$ where:
$0<x<0.3$,
$u>0$ and $w>0$,
$x+u+v+w=2$,
$x+2u+4v+5w=6$,
the electrode material having a crystal structure of disordered NaCl type. A cathode having this material as an electronically active material and also the lithium-ion battery containing this cathode are also contemplated.

8 Claims, 4 Drawing Sheets

(51) Int. Cl.
    *C01G 53/00* (2006.01)
    *H01M 10/0525* (2010.01)
    *H01M 4/485* (2010.01)
    *H01M 4/02* (2006.01)

(52) U.S. Cl.
    CPC ..... *H01M 10/0525* (2013.01); *C01P 2002/72* (2013.01); *C01P 2002/76* (2013.01); *C01P 2004/03* (2013.01); *C01P 2004/04* (2013.01); *C01P 2004/50* (2013.01); *C01P 2004/61* (2013.01); *C01P 2004/64* (2013.01); *C01P 2006/40* (2013.01); *H01M 2004/021* (2013.01); *H01M 2004/027* (2013.01); *H01M 2004/028* (2013.01)

(56) References Cited

FOREIGN PATENT DOCUMENTS

| WO | 2009120156 | 10/2009 |
| WO | WO2014073700 A1 | 5/2014 |
| WO | WO2014113795 A1 | 7/2014 |
| WO | WO2014113796 A1 | 7/2014 |

OTHER PUBLICATIONS

Yi Tin-Feng, et al., Structure and Electrochemical Performance of Niobium-Substituted Spinel Lithium Titanium Oxide Synthesized by Solid-State Method, Journal of the Electrochemical Society, 158 (3) A266-A274 (2011).

* cited by examiner

CATHODE MATERIAL FOR LI-ION BATTERIES

DOMAIN OF THE INVENTION

The invention relates to a material made up of lithium having formula $Li_{2+x}Ni_uTi_vNb_wO_4$, as well as to the use thereof as a cathode material and to the preparation method thereof.

The field of use of the present invention relates to electrical energy storage, and more particularly to lithium-ion batteries.

BACKGROUND

Lithium-ion batteries are particularly well adapted to portable electronic equipment due to their energy density and to their time stability in terms of charge and discharge cycles.

A lithium-ion battery generally comprises the following assembly:
- a positive electrode (cathode) comprising a lithium-based material,
- a negative electrode (anode), generally made up of carbon, for example, of graphite.

Reversible exchanges of $Li^+$ ions between the cathode and the anode ensure its operation. At the cathode level, the materials having the strongest energy are superstoichiometric layered lithium oxides. They enable to reach proper specific capacities (250 mAh/g). However, they have many disadvantages, mainly due to the participation of oxygen in the electrochemical processes, among which:
- a strong irreversibility at the first cycle;
- a structural instability;
- a cycling potential loss.

To overcome these problems, it has been envisaged to use materials of Rock-Salt structures (of NaCl type), for example:
- document WO 2009/120156 discloses the $Li_2FeTiO_4$ material having a 130-mAh/g capacity at C/20 and 60° C. between 3.9 V and 1.9 V
- document CN 104269520 discloses the $Li_2FeTiO_4$ material having a graphite coating and a 200-mAh/g capacity at C/30 between 5 V and 1.5 V,
- document JP 2013-206746 discloses the $Li_2NiSi_{1-x}Ti_xO_4$ material with 0<x<1 having a 120-mAh/g capacity at C/20 between 4 V and 2 V,
- document WO 2014/73700 describes the $Li_2Ni_{(1-x-y)}Co_xMn_yTiO_4$ material with x>0, y>0, having a 230-mAh/g capacity at C/100 between 4.8 V and 2 V.

However, even if $Li_2NiTiO_4$-type materials having a disordered NaCl structure have a high theoretical capacity (290 mAh/g), based on the oxidation of $Ni^{2+}$ in $Ni^{4+}$ only, these materials have a too low ion conductivity, thus limiting the performance of the material.

The Applicant has developed a new lithium-containing material having an ion conductivity greater than that of materials of $Li_2NiTiO_4$ type and a theoretical specific capacity that can reach or exceed 250 mAh/g.

DESCRIPTION OF THE SPECIFICATION

The present invention concerns an electrode material of formula $Li_{2+x}Ni_uTi_vNb_wO_4$ wherein:
0<x<0.3,
u>0 and w>0,
x+u+v+w=2,
x+2u+4v+5w=6.

In this formula, u and w are different from 0. However, v may be equal to 0; in this case, titanium is integrally substituted with nickel or niobium.

Advantageously, the above formula comprises at least one of the following parameters:
u may be in the range from 0.9 to 4/3.
v may be in the range from 0 to 0.6.
w may be in the range from 0.3 to 0.77.

The material of formula $Li_{2+x}Ni_uTi_vNb_wO_4$ is particularly adapted for a use as a cathode material, particularly in a lithium-ion battery.

Generally, this material has a crystal structure of disordered NaCl type.

A structure of NaCl type corresponds to two face-centered cubic sub-lattices (atoms distributed at the 8 apexes of a cube and at the center of each of the faces of the cube). The two sub-lattices are offset by half the side length of the mesh.

A disordered structure corresponds to a crystal having its atoms placed regularly in the sites but having an irregular atom distribution.

As already indicated, the material according to the invention has a theoretical specific capacity which can reach or exceed 250 mAh/g without involving an electrochemical activity of the oxygen of the lattice due to the $Ni^{2+}/Ni^{4+}$ couple. Further, the substitution of titanium with lithium and with a metal (nickel and/or niobium) enables to improve its ion conductivity and thus its performance.

Generally, lithium-enriched layered oxides enable to obtain strong capacities since part of the oxygen forming them takes part in the electrochemical reaction by oxidizing in charge, like metals, which creates a structural instability. The material according to the invention enables to reach 250 mAh/g without for the oxygen of the structure to oxidize, since the $Ni^{2+}/Ni^{4+}$ couple provides enough electrons.

The material according to the invention may be selected from the group comprising: $Li_{2.1}NiTi_{0.6}Nb_{0.3}O_4$; $Li_{2.05}NiTi_{0.8}Nb_{0.15}O_4$; and $Li_{2.2}NiTi_{0.2}Nb_{0.6}O_4$.

As an example of material according to the invention:
$Li_{2.2}NiTi_{0.2}Nb_{0.6}O_4$ (x=0.2; u=1; v=0.2; w=0.6) has a theoretical capacity, without intervention of oxygen, of 263 mAh/g.
$Li_{2.1}NiTi_{0.6}Nb_{0.3}O_4$ (x=0.1; u=1; v=0.6; w=0.3) has a theoretical capacity, without intervention of oxygen, of 276 mAh/g.

Generally, the theoretical specific mass capacity of the material according to the invention may be in the range from 240 to 285 mAh/g.

The material according to the invention has an ion conductivity greater than that of conventional $Li_2NiTiO_4$-type materials, due to the increase of the number of percolation paths for lithium. Indeed, lithium being the only mobile ion in the structure, it can only diffuse if one of the neighboring sites is also occupied by a lithium ion. The increase in the lithium/metal ratio enables to increase the probability of occurrence of such a configuration and thus to multiply the possible percolation paths.

The material according to the invention may appear in the form of particles and of particle agglomerates.

Advantageously, it is formed of agglomerates of from 1 to 5 micrometers formed of particles. The particles are preferably spherical. Their average diameter is advantageously in the range from 30 to 100 nanometers.

The present invention also relates to the method of manufacturing the material of formula $Li_{2+x}Ni_uTi_vNb_wO_4$.

It may particularly by a solid, or sol-gel, or hydrothermal, or molten (molten salt) synthesis. Advantageously, it is formed by molten salt synthesis.

Such synthesis techniques pertain to the general knowledge of those skilled in the art and require no specific conditions.

As an example, the synthesis may be performed with molten salts from lithium, nickel, titanium, and niobium precursors in a mixture of NaCl/KCl.

The precursors used in this case may in particular be $Li_2CO_3$, $Ni(CH_3COO)_2 \cdot 4H_2O$, $TiO_2$, and $Nb_2O_5$.

The present invention also relates to a cathode where the electronically-active material is the material, described hereabove, of formula $Li_{2+x}Ni_uTi_vNb_wO_4$.

The present invention also relates to a lithium-ion battery (or accumulator) comprising this cathode.

Such a lithium-ion battery particularly comprises the assembly of a cathode according to the invention, of an electrolyte made up of lithium salt, and of an anode, generally made up of carbon (graphite, for example).

It will be within the abilities of those skilled in the art to prepare this battery by using their general knowledge to implement conventional techniques, particularly by deposition of an ink comprising the $Li_{2+x}Ni_uTi_vNb_wO_4$ material.

The invention and the resulting advantages will better appear from the following non-limiting drawings and examples, provided as an illustration of the invention.

EMBODIMENTS OF THE INVENTION

Synthesis

The $Li_{2+x}NiTi_{1-4x}Nb_{3x}O_4$ (x=0.05, 0.10, 0.20) materials have been synthesized by a molten salt process according to the following protocol, under air.

The $Li_2CO_3$, $Ni(CH_3COO)_2 \cdot 4H_2O$, $TiO_2$, and $Nb_2O_5$ precursors are added in stoichiometric proportions to a NaCl/KCl (4 eq mol) eutectic mixture.

After the mixing, the assembly is taken to 350° C. for 2 hours, and then to 670° C. for 3 hours.

After the cooling, the material is washed with distilled water to remove the salt mixture, and then dried at 80° C. under air.

Figure 1:
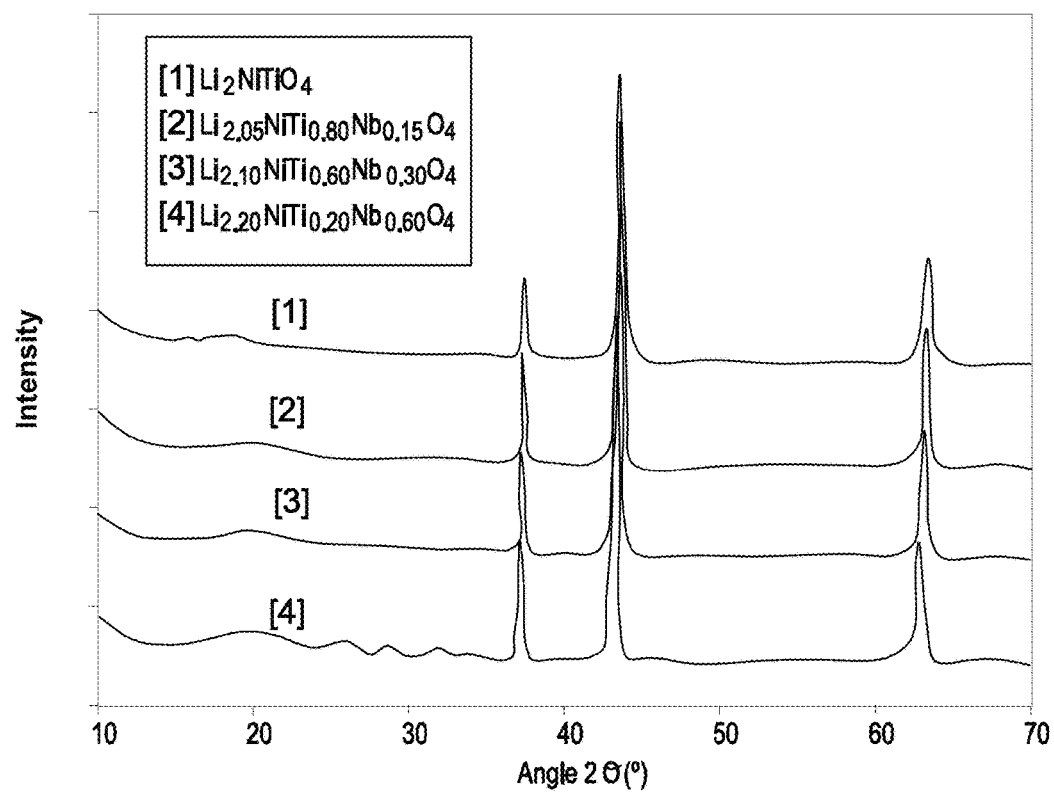
FIG. 1 illustrates diffractograms of the $Li_{2+x}NiTi_{1-4x}Nb_{3x}O_4$ compounds, with x=0.05, 0.10, 0.20.
Figure 2:
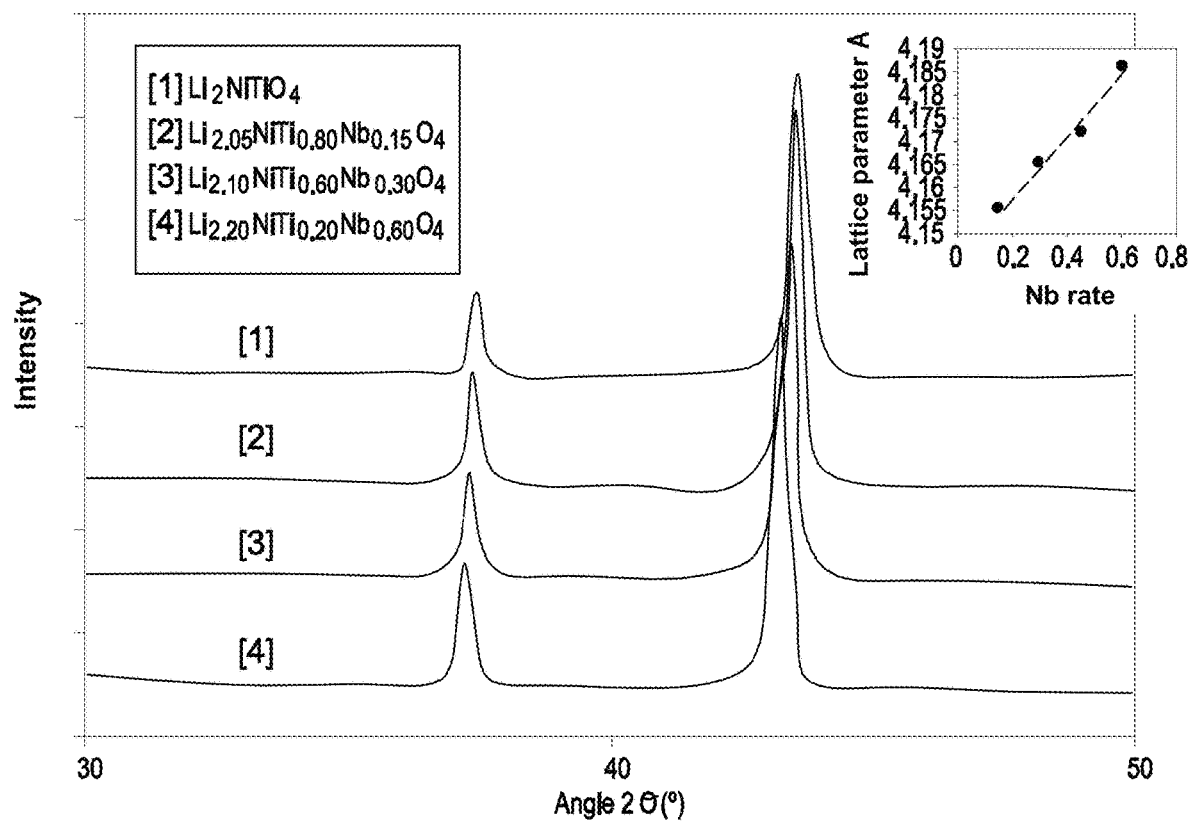
FIG. 2 corresponds to an enlargement of the diffractograms of the $Li_{2+x}NiTi_{1-4x}Nb_{3x}O_4$ compounds (x=0.05, 0.10, 0.20) between 30 and 50° C.

The diffractograms of FIGS. 1 and 2 show the different phases substituted with Nb, showing a linear variation of the lattice parameters, which indicates that substitution results in a solid solution.

Electrochemical Tests a) Preparation of the Positive Electrode

The active material of formula $Li_{2+x}NiTi_{1-4x}Nb_{3x}O_4$ (x=0.05, 0.10, 0.20) is mixed at 80 wt. % with carbon black (Super P carbon, 10%) and a PVDF binder (polyvinylidene fluoride 10%) dissolved in N-methyl-2-pyrrolidone.

The mixture is then spread on an aluminum foil (100 micrometers) and then dried at 60° C.

b) Mounting of the Accumulator

The electrode thus formed is introduced into a cell of "button cell" type at format 2032. The negative electrode is made of metal lithium.

Two types of separators are used: a polypropylene film (Celgard® 2400) and a polyolefin film (Viledon®).

The electrolyte used is a compound of ethylene carbonate, of propylene carbonate, of dimethyl carbonate, and of lithium hexafluorophosphate ($LiPF_6$) (Electrolyte LP100).

c) Galvanostatic Cycling

At room temperature, a current is imposed to the system to obtain a C/50 rate, that is, the extraction/insertion of a lithium ion within 50 hours.

d) Results

Figure 3:
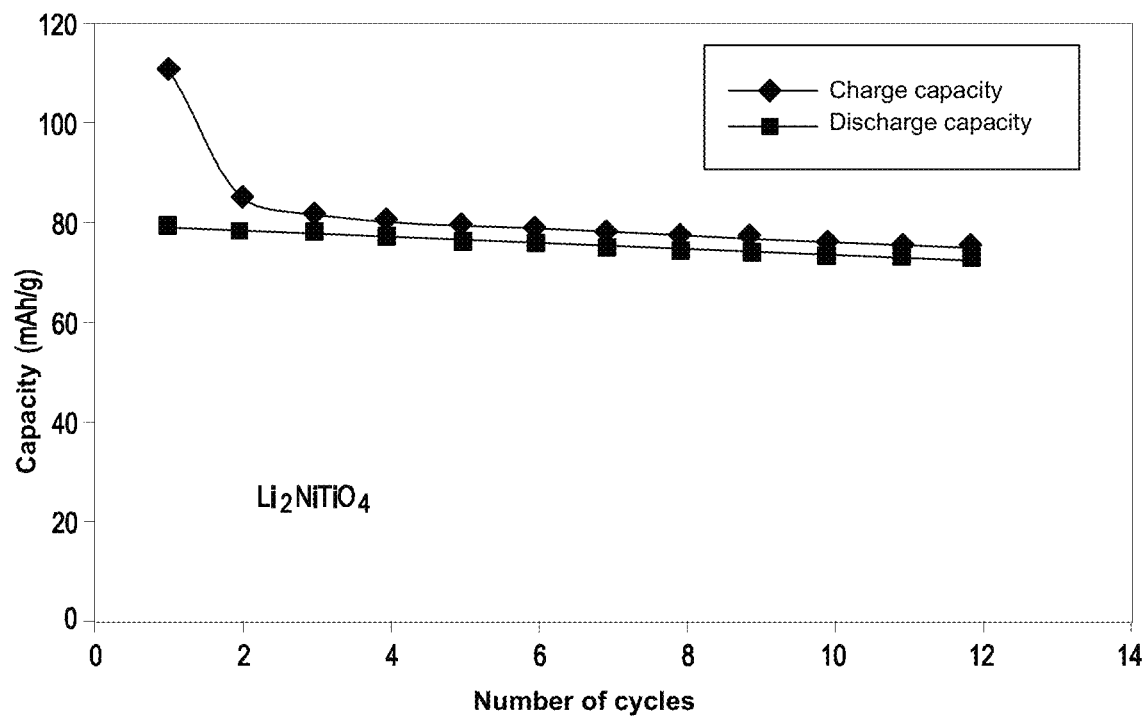
FIG. 3 illustrates the charge and discharge capacity of the $Li_2NiTiO_4$ material according to the number of cycles.
Figure 4:
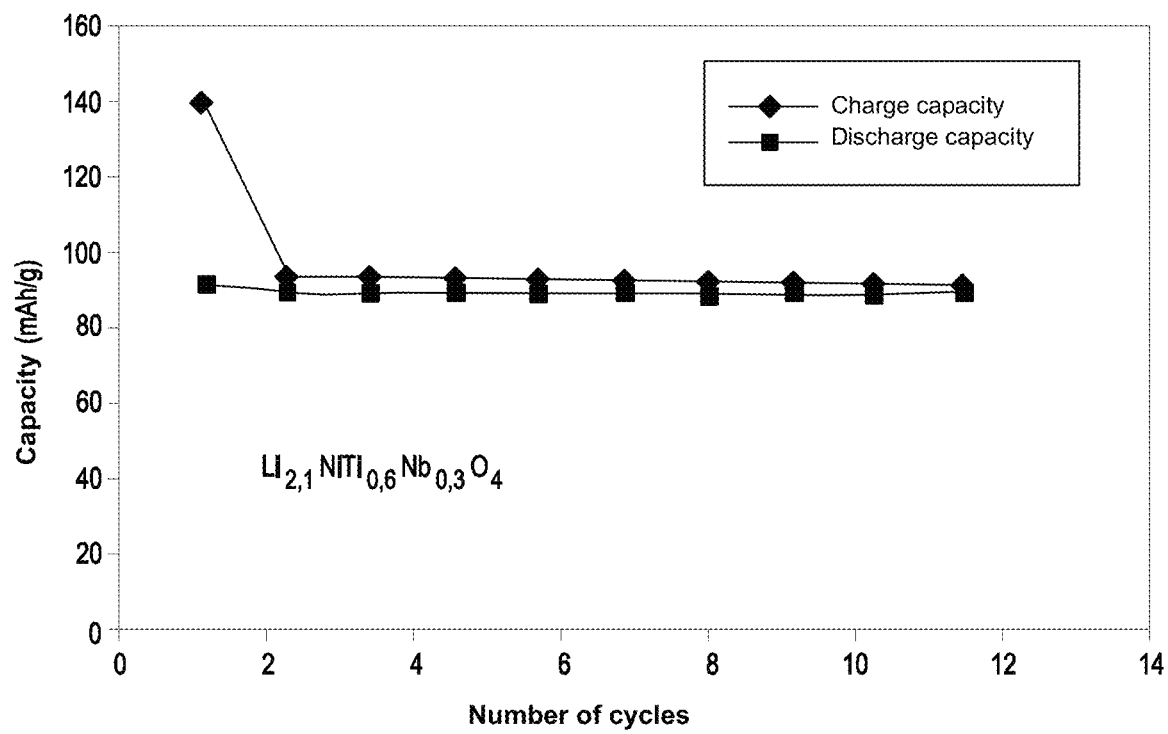
FIG. 4 illustrates the charge and discharge capacity of the $Li_{2.1}NiTi_{0.6}Nb_{0.3}O_4$ material according to the number of cycles.
Figure 5:
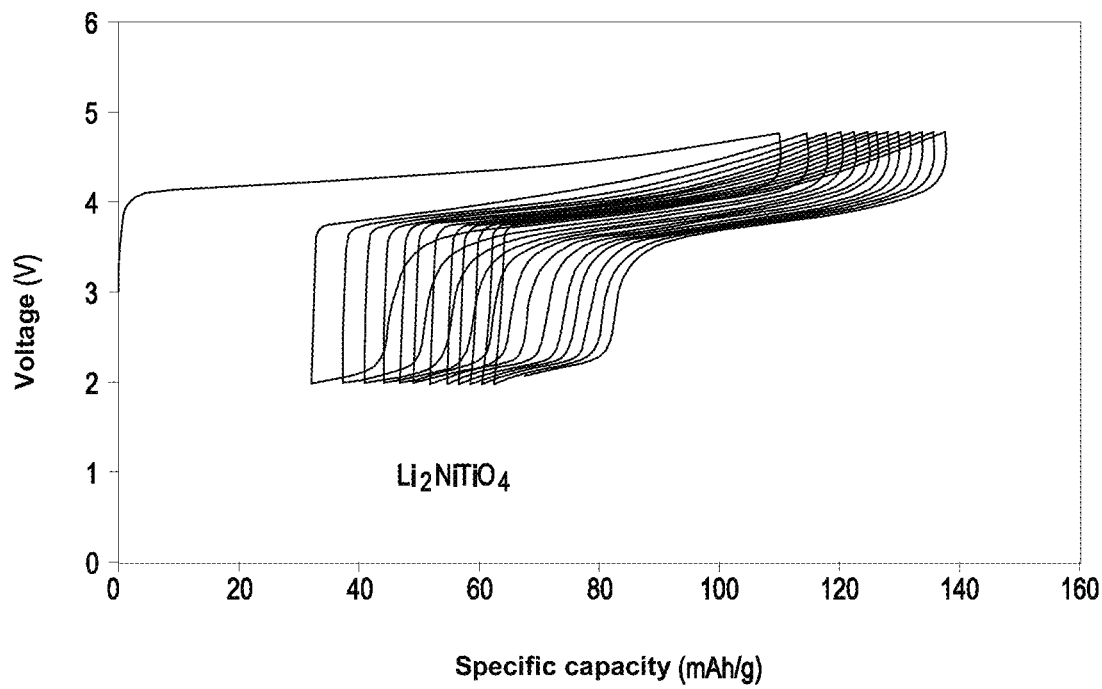
FIG. 5 illustrates the voltage of the $Li_2NiTiO_4$ material according to the specific capacity.
Figure 6:
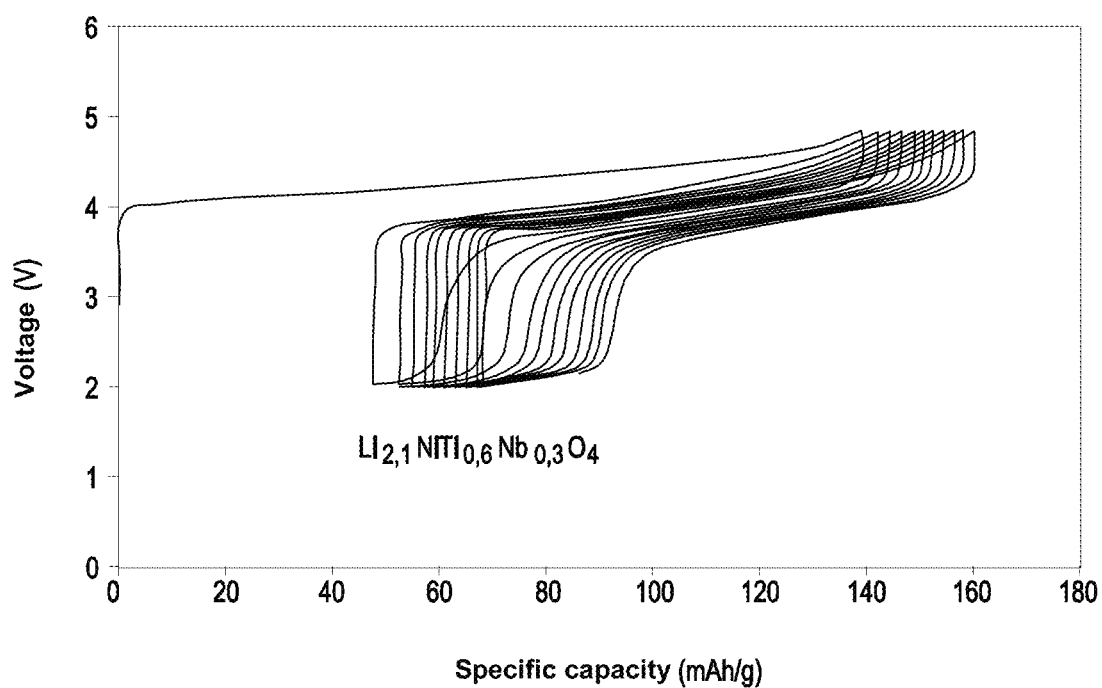
FIG. 6 illustrates the voltage of the $Li_{2.1}NiTi_{0.6}Nb_{0.3}O_4$ material according to the specific capacity.

FIGS. 3 and 4 show that the substitution of titanium with lithium and niobium results in a capacity which is greater (80 mAh/g vs. 91 mAh/g) and more stable during the cycling at C/50 between 4.8 V and 2 V (FIGS. 5 and 6).

Such an improvement is imputed to a better ion conductivity of the material since the polarization decreases along with the substitution.

Figure 7:
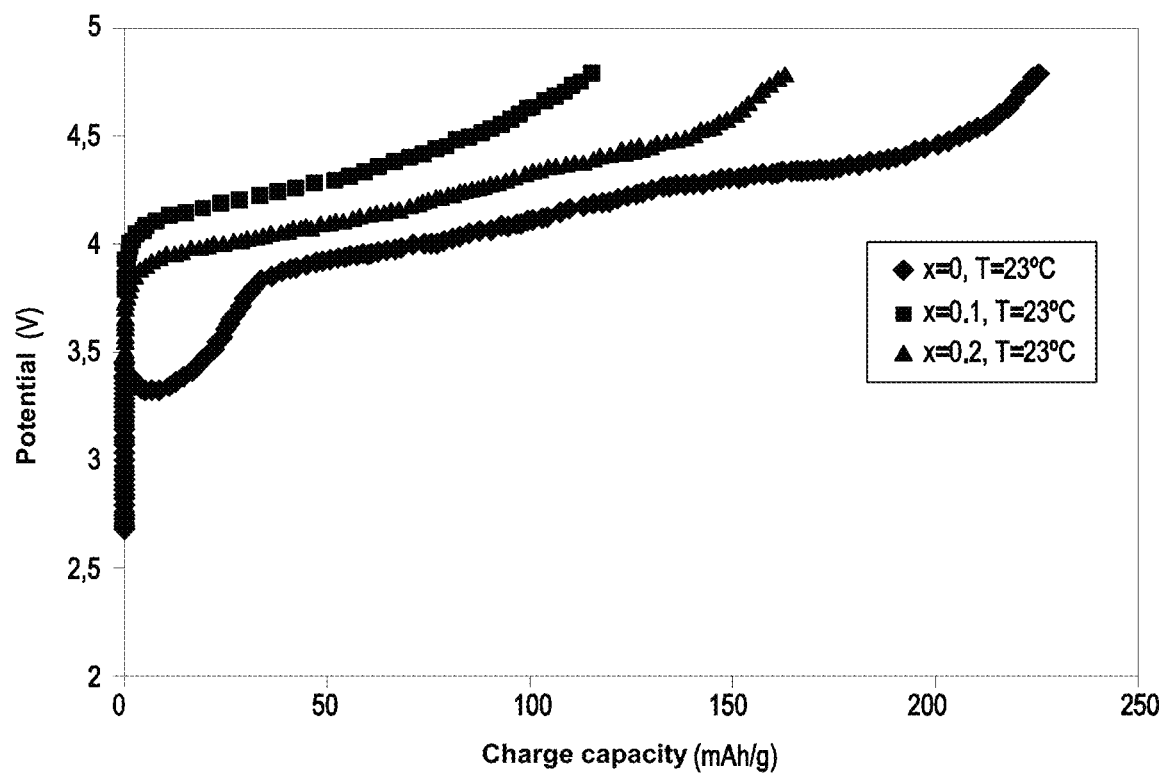
FIG. 7 illustrates the potential according to the charge capacity of the $Li_{2+x}NiTi_{1-4x}Nb_{3x}O_4$ materials (x=0.05, 0.10, 0.20).

FIG. 7 corresponds to the potential according to the charge capacity. It shows the importance of the substitution of titanium atoms with lithium and niobium atoms. The larger the substitution rate, the greater the capacity that can be reached at first charge. For the highest substitution rate (x=0.2), 87% of the theoretical capacity are reached at room temperature and 95% are reached at 55° C.

Figure 8:
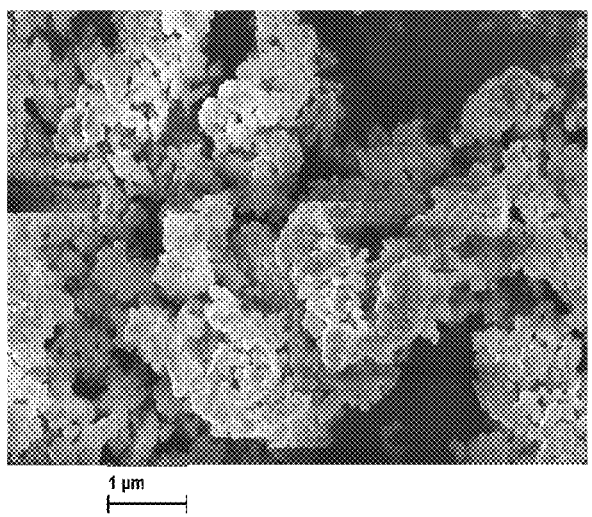
FIG. 8 shows an image obtained by scanning electron microscope of the $Li_{2.1}NiTi_{0.6}Nb_{0.3}O_4$ material.

FIG. 8 corresponds to an image obtained by scanning electron microscope of the $Li_{2.1}NiTi_{0.6}Nb_{0.3}O_4$ material. It illustrates the presence of agglomerates of generally spherical particles.

The invention claimed is:

1. An electrode material, comprising: an electrode material of formula $Li_{2+x}Ni_uTi_vNb_wO_4$ wherein:
   0<x<0.3,
   u>0 and w>0,
   x+u+v+w=2,
   x+2u+4v+5w=6,
   the electrode material having a crystal structure of disordered NaCl type.

2. The electrode material of claim 1, wherein u is in the range from 0.9 to 4/3.

3. The electrode material of claim 1, wherein v is in the range from 0 to 0.6.

4. The electrode material of claim 1, wherein w is in the range from 0.3 to 0.77.

5. The electrode material of claim 1, wherein said material is selected from the group consisting of: $Li_{2.1}NiTi_{0.6}Nb_{0.3}O_4$; $Li_{2.05}NiTi_{0.8}Nb_{0.15}O_4$; and $Li_{2.2}NiTi_{0.2}Nb_{0.6}O_4$.

6. The electrode material of claim 1, wherein said material is formed of agglomerates of from 1 to 5 micrometers formed of particles having an average diameter in the range from 30 to 100 nanometers.

7. A cathode having as an electronically active material comprising the material of claim 1.

8. A lithium-ion battery containing the cathode of claim 7.

* * * * *